(12) United States Patent
Lee (10) Patent No.: US 12,118,898 B2
(45) Date of Patent: Oct. 15, 2024

(54) VOICE VISUALIZATION SYSTEM FOR ENGLISH LEARNING, AND METHOD THEREFOR

(71) Applicant: Gi Hun Lee, Markham (CA)

(72) Inventor: Gi Hun Lee, Markham (CA)

(73) Assignee: Gi Hun Lee, Markham (CA)

( * ) Notice: Subject to any disclaimer, the term of this patent is extended or adjusted under 35 U.S.C. 154(b) by 0 days.

(21) Appl. No.: 18/260,606

(22) PCT Filed: Jan. 27, 2022

(86) PCT No.: PCT/KR2022/001529
§ 371 (c)(1),
(2) Date: Jul. 6, 2023

(87) PCT Pub. No.: WO2022/169208
PCT Pub. Date: Aug. 11, 2022

(65) Prior Publication Data
US 2024/0304099 A1    Sep. 12, 2024

(30) Foreign Application Priority Data

Feb. 5, 2021   (KR) .......................... 10-2021-0016463

(51) Int. Cl.
*G09B 5/02*    (2006.01)
*G10L 15/04*   (2013.01)
(Continued)

(52) U.S. Cl.
CPC ............. *G09B 5/02* (2013.01); *G10L 15/04* (2013.01); *G10L 15/187* (2013.01); *G10L 21/14* (2013.01); *G10L 25/21* (2013.01)

(58) Field of Classification Search
CPC .. G09B 5/00; G09B 5/02; G10L 15/04; G10L 15/18; G10L 15/187; G10L 21/14; G10L 25/21
See application file for complete search history.

(56) References Cited

U.S. PATENT DOCUMENTS

| | | | | |
|---|---|---|---|---|
| 11,410,570 | B1* | 8/2022 | Yang | ..................... H04L 41/122 |
| 2016/0365099 | A1* | 12/2016 | Pandey | ............... G10L 21/0264 |
| 2017/0294184 | A1* | 10/2017 | Bradley | .................. G10L 25/18 |

FOREIGN PATENT DOCUMENTS

| | | |
|---|---|---|
| JP | 2019-053235 A | 4/2019 |
| KR | 10-2005-0074298 A | 7/2005 |

(Continued)

OTHER PUBLICATIONS

International Search Report for PCT/KR2022/001529 by Korean Intellectual Property Office dated May 4, 2022.

*Primary Examiner* — Timothy A Musselman
(74) *Attorney, Agent, or Firm* — BROADVIEW IP LAW, PC (57) ABSTRACT

A speech visualization system according to the present invention includes: a speech signal input unit for receiving speech signals of sentences with English pronunciations; a speech information analysis unit for analyzing speech information with frequencies, energy, and time of the speech signals and the text corresponding to the speech signals to divide the speech information into at least one or more segments; a speech information classification unit for classifying the segments of the speech information into flow units and each flow unit into at least one or more sub flow units each having at least one or more words; a visualization property assignment unit for assigning visualization properties for speech visualization to the analyzed and classified speech information; and a visualization processing unit for performing visualization processing based on the assigned visualization properties to generate speech visualization data.

15 Claims, 9 Drawing Sheets

| | Dictionary | Processed | Principle of processing |
|---|---|---|---|
| Syllable | con·tract | con·tract- | Syllable is represented with color box, dot(·) is inserted between syllables, and hyphen(-) is inserted between words |
| Stress | [kάntraekt] | co'n·tract | A stressed portion is represented with boldface letter(o') |
| Linking sound | | co'n·tract | Linking sound is represented with a linking line |
| | | co'n·tract | Pronounced along the underling pen |

(51) Int. Cl.
*G10L 15/187* (2013.01)
*G10L 21/14* (2013.01)
*G10L 25/21* (2013.01)

(56) References Cited

FOREIGN PATENT DOCUMENTS

| KR | 10-2008-0081635 A | 9/2008 |
| KR | 10-1508117 B1 | 4/2015 |
| KR | 10-2017-0055146 A | 5/2017 |

* cited by examiner

| | |
|---|---|
| ◇<br>Rhombus | In the case of one short vowel and/or one voiced consonant<br>Ex) go, put, sit, ... |
| ⬡<br>Hexagon | In the case where mid vowels and diphthong in most commonly used forms are included, two or more voiced consonants are included, or two or more rhombuses on the same frequency exist continuously<br>Ex) sleep, seat, going to, ... |
| △ ▽ ◁<br>Triangle | Slightly voiced function words, schwa sounds, and intonation processing of the last part of sentence<br>Ex) for, in, at ... |
| ◤ ◢<br>Right triangle | In the case where a slight sound difference (nuance) is represented with small sound and in the case of unobvious intonation |

Friends and Family

VOICE VISUALIZATION SYSTEM FOR ENGLISH LEARNING, AND METHOD THEREFOR

CROSS-REFERENCE TO RELATED APPLICATIONS

This application is a National Phase Entry Application of PCT Application No. PCT/KR2022/001529 filed on Jan. 27, 2022, which claims priority to Korean Patent Application No. 10-2021-0016463 filed on Feb. 5, 2021, in Korean Intellectual Property Office, the entire contents of which are hereby incorporated by reference in its entirety.

TECHNICAL FIELD

The present invention relates to a speech visualization system and method for English learning.

In specific, the present invention relates to a system and method that is capable of allowing the speech corresponding to English sentences to be visualizedly provided to support listening and speaking practice for a user who learns English as a second language.

BACKGROUND ART

In terms of a process, language is a pattern matching process that permits people to communicate and share meaning through patterns practiced for a long period of time.

Language is classified into a phonetic language in which the pronunciation of a word is the same as its spelling and a non-phonetic language in which the pronunciation of a word is not dependent on its spelling.

Otherwise, language is classified into a syllable-timed language and a stress-timed language. In the case of the syllable-timed language, syllables take approximately equal amounts of time to pronounce, and the pitch in words is not important. Contrarily, the stress-timed language is a language where the stressed syllables are said at approximately regular intervals, and the pitch, lengths, and intensities of sounds in words constituting one sentence are important.

English is a non-phonetic language and a stress-timed language, but countries where English is not spoken as a first language do not have any features of the non-phonetic language and stress-timed language.

For example, Korean is a phonetic language and a syllable-timed language. Accordingly, if a user who speaks Korean as a first language learns English based on the linguistic features of Korean, there are limitations in his or her English learning by listening/speaking.

In the case of English learning without any grasp of the linguistic features of English, a user who learns English as a second language is hard to learn English well. Accordingly, learning English by memorizing words and reading and writing is not helpful in communication sharing and improvement in real life. In learning English, listening and speaking practice is more effective than memorizing words. Practice in which a lot of words are memorized to make a sentence in word order of subject, verb, and object fails to provide English learning with rhythm produced in real English conversations.

To learn English as a second language, accordingly, it is necessary to perform speech visualization capable of obviously expressing differences between a first language and English as a second language and suggesting methods for combining stress of English words.

Meanwhile, a conventional visualization technique for reflecting the linguistic features of English has been disclosed.

Figure 1:
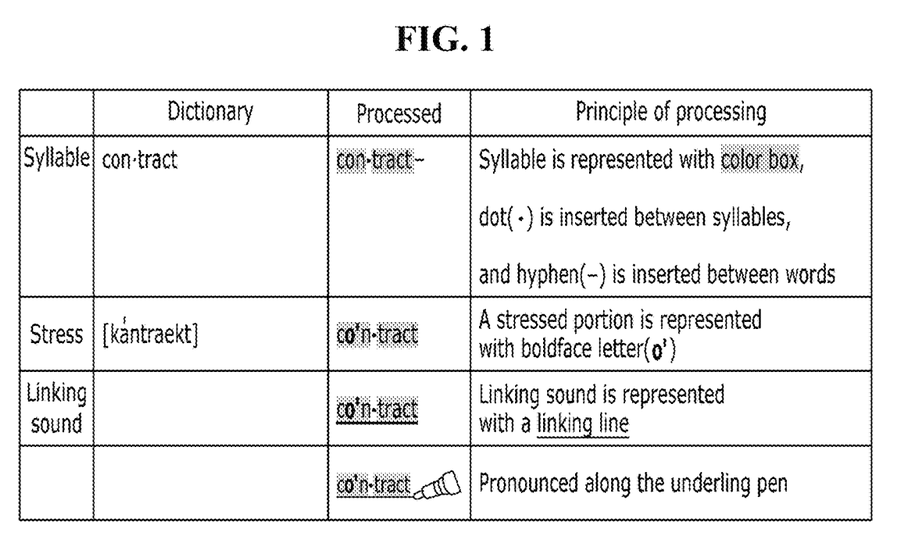
FIG. 1 is a block diagram showing a speech visualization example of a conventional English learning system.

FIG. 1 is a block diagram showing a speech visualization example of a conventional English learning system.

The conventional English learning system as disclosed in Korean Patent Application Laid-open No. 10-2016-0001332 is configured to distinguish the syllables when pronounced as color boxes and insert a dot between syllables. Further, a hyphen is inserted between words, and stress is represented in boldface type, and a linking sound is represented with a linking line.

Such processing just permits the syllables and spacing occurring in a text to be represented with symbols and the consonants/vowels corresponding to stress to be represented with boldface letters, thereby failing to overcome the limitations of the syllable-timed language based on Korean.

Further, the conventional English learning system unnecessarily provides information of spacing on sentences and syllables of words that does not correspond to a native English speaker's pronunciation, and in this case, the information is not proper for learning materials for listening/speaking.

Accordingly, there is a need for developing a speech visualization method capable of visualizing pronunciation and stress on which the properties of English as the non-phonetic language and the stress-timed language and the thought groups produced according to the context of one sentence are reflected.

DETAILED DESCRIPTION OF THE INVENTION

Technical Problems

Accordingly, it is an object of the present invention to provide a visualization system and method of English speech that is capable of reflecting thought groups according to the context of English sentences.

It is another object of the present invention to provide a speech visualization system and method for English learning that is capable of providing speech visualization data on which the syllables and spacing of a text and the linguistic features of English are reflected.

It is yet another object of the present invention to provide a speech visualization system and method for English learning that is capable of providing speech visualization data with which real English pronunciation and stress are intuitively figured out and two or more English sentence pronunciations are compared with each other.

It is still another object of the present invention to provide a speech visualization system and method for English learning that is capable of customizedly visualizing pronunciation of English sentences to a user.

Technical Solutions

To accomplish the above-mentioned objects, according to an aspect of the present invention, a speech visualization system may include: a speech signal input unit for receiving speech signals of sentences with English pronunciations; a speech information analysis unit for analyzing speech information with frequencies, energy, and time of the speech signals and the text corresponding to the speech signals to divide the speech information into at least one or more segments; a speech information classification unit for classifying the segments of the speech information into flow units and each flow unit into at least one or more sub flow units each having at least one or more words; a visualization property assignment unit for assigning visualization properties for speech visualization to the analyzed and classified speech information; and a visualization processing unit for performing visualization processing based on the assigned visualization properties to generate speech visualization data, wherein the visualization properties may have the arrangements of the sub flow units on a time axis and the frequency height information on each sub flow unit.

In this case, the segments may be divided with respect to time during which continuous pronunciation is provided.

Further, the speech information analysis unit may include a natural language processor for performing natural language processing, and the properties of the at least one or more words included in the sub flow units may be classified into content words having meaning and function words used functionally, the content words and the function words of the sub flow units being visualized with frequency height information different from each other.

Furthermore, the visualization property assignment unit may include a syllable recombiner for recombining the at least one or more words to the syllables pronounced continuously in the corresponding sub flow unit.

Also, the visualization property assignment unit may include a special property provider for providing at least one or more of stress, liaisons, silent letters, schwa sounds, and diphthongs.

In this case, the visualization units may have the shapes of polygons whose at least one surface has an acute angle to accurately recognize arrangements on a frequency axis so that the heights between the visualization units are intuitively recognized.

Further, among the words in the speech visualization data, the vowels or consonants with no real sounds may be disposed on the lower portions of the corresponding visualization units or on small size visualization units, so that the portions with real sounds are emphasized.

Moreover, tops of the outer lines of the speech visualization data may be different in thickness so that the intensity of stress is represented according to the thicknesses of the tops.

In this case, the visualization processing unit may include:
a visualization tool database for storing visualization tools; a visualization tool selector for providing the selection of the visualization tools stored in the visualization tool database; and a visualization unit matching part for matching visualization units representing the visualization properties included in the visualization tool with the assigned visualization properties.

The speech visualization system may further include: an output unit for synchronizing the speech visualization data with the speech signals and outputting the synchronized speech visualization data; and a comparison processing unit for providing comparison result values between the outputted speech visualization data and practice speech signals received from a user.

Further, the comparison processing unit may generate practice visualization data based on the practice speech signals and provide the comparison results between the practice visualization data and the outputted speech visualization data.

To accomplish the above-mentioned objects, according to another aspect of the present invention, a speech visualization method may include the steps of: receiving speech signals represented with frequencies, energy, and time; performing speech information pre-processing in which the speech signals are divided into at least one or more segments, based on time information with the energy included in the speech signals, and natural language processing is performed; classifying the segments of the speech information into flow units and each flow unit into at least one or more sub flow units each having at least one or more words to thus generate recombined speech information; applying metadata to the flow units, the sub flow units, and the at least one or more words to assign visualization properties to the recombined speech information; providing the selection of visualization tools for visualization processing using the visualization properties; if the visualization tool is selected, generating speech visualization data using the recombined speech information to which the metadata are applied; and outputting the generated speech visualization data, wherein the visualization properties have the arrangements of the sub flow units on a time axis and the frequency height information on each sub flow unit.

Further, the speech visualization system may include the step of assigning special properties in which at least one or more of stress, liaisons, silent letters, schwa sounds, and diphthongs are assigned, after the step of generating the recombined speech information.

In this case, the properties of the at least one or more words included in the sub flow units may be classified into content words having meaning and function words used functionally, the content words and the function words of the sub flow units being visualized with frequency height information different from each other.

Further, the speech visualization system may include the steps of: receiving practice speech signals from a user; generating practice speech visualization data of the practice speech signals; and outputting comparison result values of the similarity between the outputted speech visualization data and the practice speech visualization data.

Advantageous Effects of the Invention

According to the present invention, the speech visualization system and method for English learning can provide the visualization data of the English speech on which thought groups are reflected according to the context of English sentences.

According to the present invention, further, the speech visualization system and method for English learning can provide the speech visualization data on which the linguistic features of English not dependent on the syllables and spacing of texts are reflected.

According to the present invention, moreover, the speech visualization system and method for English learning can provide the speech visualization data with which real English pronunciation and stress are figured out intuitively.

According to the present invention, furthermore, the speech visualization system and method for English learning can visualizedly compare the pronunciation of the user with the speech visualization data.

BEST MODE FOR INVENTION

The best mode for the invention may be chosen from the mode for the invention as will be discussed below.

MODE FOR INVENTION

Hereinafter, an explanation of the present invention will be given with reference to attached drawings. Before the present invention is disclosed and described, it is to be understood that the disclosed embodiments are merely exemplary of the invention, which can be embodied in various forms. If it is determined that the detailed explanation on the well-known technology related to the present invention makes the scope of the present invention not clear, the explanation will be avoided for the brevity of the description. Further, the parts corresponding to those of the drawings are indicated by corresponding reference numerals.

When it is said that one element is described as being "connected" or "coupled" to the other element, one element may be directly connected or coupled to the other element, but it should be understood that another element may be present between the two elements. In the description, when it is said that one portion is described as "includes" any component, one element further may include other components unless no specific description is suggested.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Hereinafter, an embodiment of the present invention will be explained in detail with reference to the attached drawings.

Figure 2:
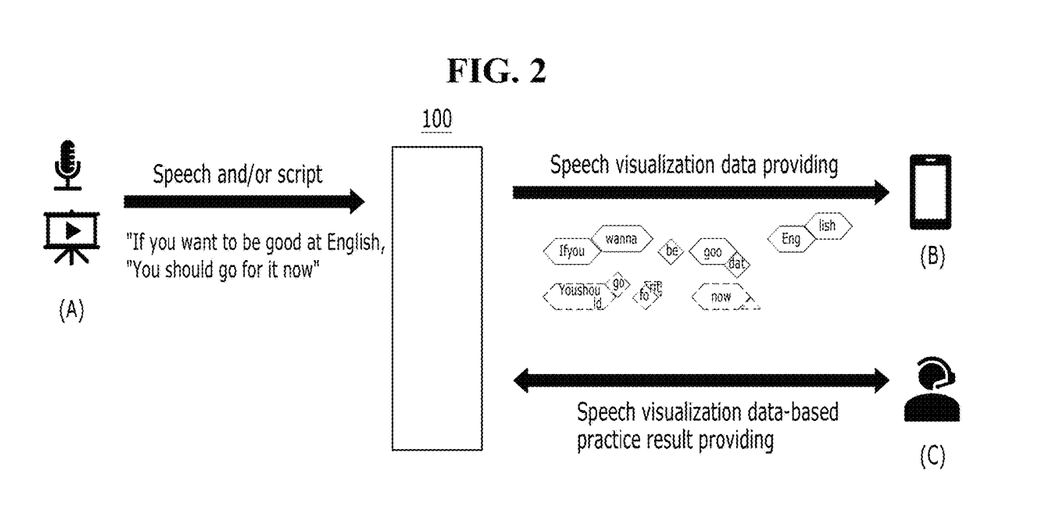
FIG. 2 is a flowchart showing an operational outline of a speech visualization system according to the present invention.

FIG. 2 is a flowchart showing an operational outline of a speech visualization system according to the present invention.

A speech visualization system 100 according to the present invention receives real speech and/or script from a speech input device A. The speech input device A is a real speech sensor such as a microphone, and otherwise, it provides pre-made speech content. Further, speech and text transform each other, and accordingly, even in the case where only the speech is inputted, the speech is converted into script, so that the script as well as the speech is used as speech information.

Further, it is possible that a text is converted into speech information with native speaker pronunciation using an English-based Text to Speech (TTS) system. Like this, the speech input device A is not limited to a specific input device and thus includes all devices that input, transmit, and receive speech information through which the context, energy and frequencies of speech inputted are measured.

The received speech information has the energy and frequency information of the speech, and further, if the speech information is inputted in the unit of a sentence, it has context information. Through the speech visualization system 100, the received speech information is converted into visualization data, synchronized with the speech, and outputted to an output device B.

The output device B is an arbitrary device such as a smartphone, a tablet computer, a laptop computer, a desktop computer, and the like with a display unit, a memory, a processor, and a communication interface.

The outputted speech visualization data have flow units divided into thought groups and sub flow units divided into combinations of content words and function words, and the outputted speech visualization data visualize spacing and stress corresponding to the real pronunciation on a time stamp.

A user input device C inputs speech information of a user to the speech visualization system 100 to produce practice speech visualization data in the same manner as above.

The physical correlation values of frequency and/or energy of the practice speech visualization data are compared with those of the speech visualization data, and accordingly, the comparison result values for representing the similarity of the practice speech visualization data to the pronunciation of the reference speech visualization data are provided for the user.

Hereinafter, an explanation of the configuration and operation of the speech visualization system 100 according to the present invention will be given in detail.

Figure 3:
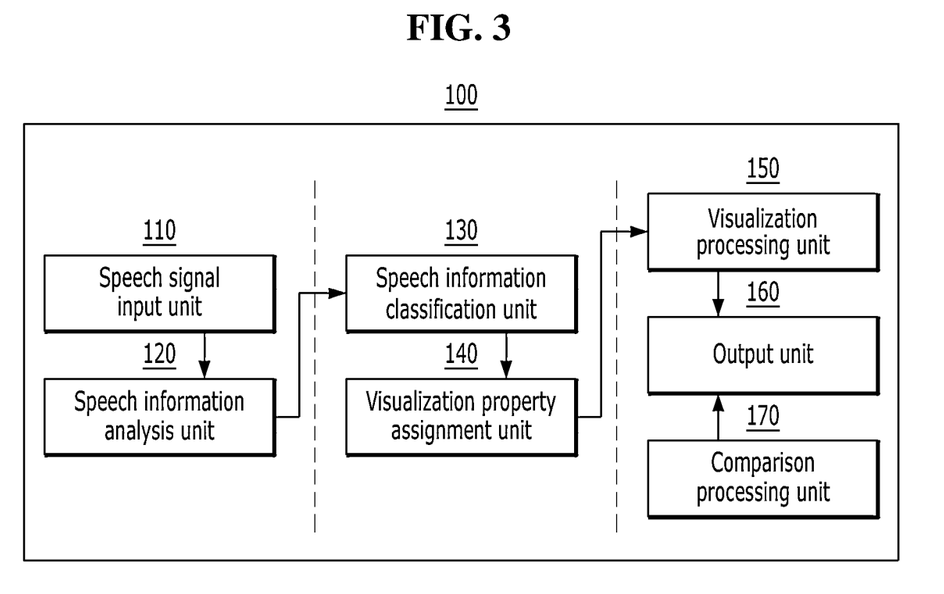
FIG. 3 is a block diagram showing the speech visualization system according to the present invention.

FIG. 3 is a block diagram showing the speech visualization system according to the present invention.

The speech visualization system 100 according to the present invention includes a speech signal input unit 110, a speech information analysis unit 120, a speech information classification unit 130, a visualization property assignment unit 140, a visualization processing unit 150, an output unit 160, and a comparison processing unit 170.

The speech signal input unit 110 receives physical speech signals corresponding to English sentence pronunciation. The speech signals are generated through the direction vocalization of the reference speech of the user, and further, they may be generated through automated TTS type reference speech. The speech signals are represented with elements of frequencies, amplitudes (energy), and time.

The speech information analysis unit 120 analyzes the speech signals and then analyzes the sentences and context represented with speech. A term 'speech information' used in the description include the frequencies, amplitudes (energy), and time included in the speech signals and the text, words, context, and other meaning information of sentences represented with speech. The speech information analysis unit 120 divides the speech into at least one or more segments and maps the information (e.g., frequencies, energy, and time) acquired from the speech signals received from the speech signal input unit 110 to the segments and components.

A configuration of the speech information analysis unit 120 will be explained in detail later with reference to FIGS. 4 and 5.

The speech information classification unit 130 classifies the components of the speech information using the analyzed speech information in such a way that the components are adequate for learning. The speech information is classified into flow units and sub flow units in consideration of linguistic features of English. Each sub flow unit is classified into at least one content word and at least one function word.

A configuration of the speech information classification unit 130 will be explained in detail later with reference to FIGS. 6 and 7.

The visualization property assignment unit 140 assigns properties for speech visualization to the speech information according to the analyzed and classified speech information. The visualization property assignment unit 140 assigns the information of frequencies, energy, and time and the information of spacing and syllables reprocessed/recombined for visualization to the visualization information. Further, the visualization property assignment unit 140 assigns special properties prepared for the visualization for learning.

A configuration of the visualization property assignment unit 140 will be explained in detail later with reference to FIGS. 8 and 9.

The visualization processing unit 150 applies the visualization properties assigned to the speech information to a selected visualization tool to perform visualization processing. The visualized speech information includes the information of flow units and sub flow units, the information of content words and function words, stress, liaisons, silent letters, and schwa sounds. Further, the sentences in which the reprocessed/recombined spacing and syllables are divided properly for English listening/speaking learning are generated with the time stamp synchronized with the speech signals.

A configuration of the visualization processing unit 150 will be explained in detail later with reference to FIGS. 10 to 13.

The output unit 160 synchronizes the speech visualization data with the speech signals and outputs the synchronized speech visualization data. The output unit 160 may be a single independent device, and otherwise, the output unit 160 may be a server device from which results are outputted online.

The comparison processing unit 170 compares the reference speech visualization information outputted from the output unit 160 with the practice speech signals newly inputted by the user and provides comparison results. Practice speech visualization data are produced from the practice speech signals inputted by the user and thus compared with the reference speech visualization information, and next, the comparison values are generated as the visualization data again, thereby performing the feedback on the similarity.

Under the above-mentioned configuration, the reference speech signals are converted into the reference speech visualization data that are recombined and reprocessed to have learning elements on which the linguistic features of English are reflected and then provided for the user.

The user intuitively understands English pronunciation features through the reference speech visualization data and allows his or her practice pronunciation to be generated as the visualization data to thus receive the feedback about intuitive comparison results.

Now, an explanation of the generation of the speech visualization data according to the present invention will be given in detail with reference to sub components constituting each unit of the speech visualization system 100.

Figure 4:
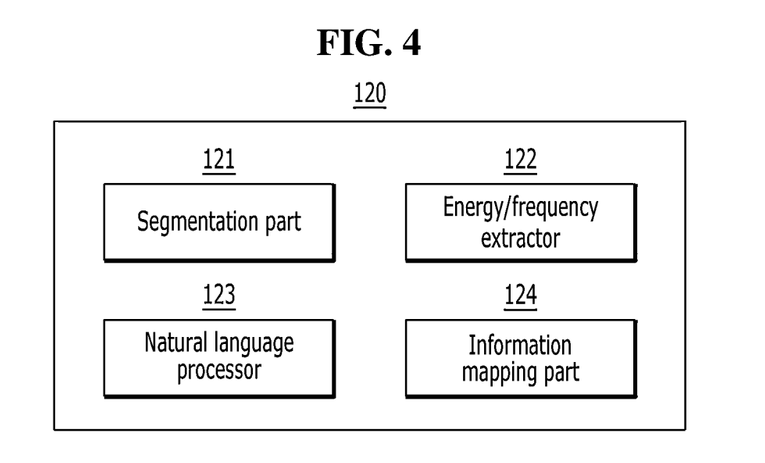
FIG. 4 is a block diagram showing a speech information analysis unit of the speech visualization system according to the present invention.

FIG. 4 is a block diagram showing the speech information analysis unit of the speech visualization system according to the present invention.

The speech information analysis unit 120 includes a segmentation part 121, an energy/frequency extractor 122, a natural language processor 123, and an information mapping part 124.

The segmentation part 121 divides the text included in the inputted speech information into at least one or more segments with respect to the time during which continuous pronunciations are made. The segments do not necessarily correspond to grammatical spacing and are generated by time information of the speech signals having real energy.

The energy/frequency extractor 122 measures the amplitudes and frequencies of the speech signals and extracts the measured values as available values. According to the present invention, the values represented with the amplitudes are called energy. The extracted values are sampled or normalized to the ranges or levels of precision needed for the speech visualization.

The natural language processor 123 performs natural language analysis of the inputted speech information through the utilization of a self natural language processing engine or an external natural language processing engine. The natural language processing is a technique that allows computers to perform the morphological analysis, syntactic analysis, semantic analysis, and pragmatic analysis of human language according to the performance of the engine. According to the present invention, the ability of the natural language processor 123 to divide flow units, sub flow units, content words, function words, and special properties on the speech information is required.

The information mapping part 124 applies the time stamp to the respective segments and maps the energy/frequency information to the segments. Further, the information mapping part 124 additionally reflects the analyzed results in the natural language processing on the mapping.

Figure 5:
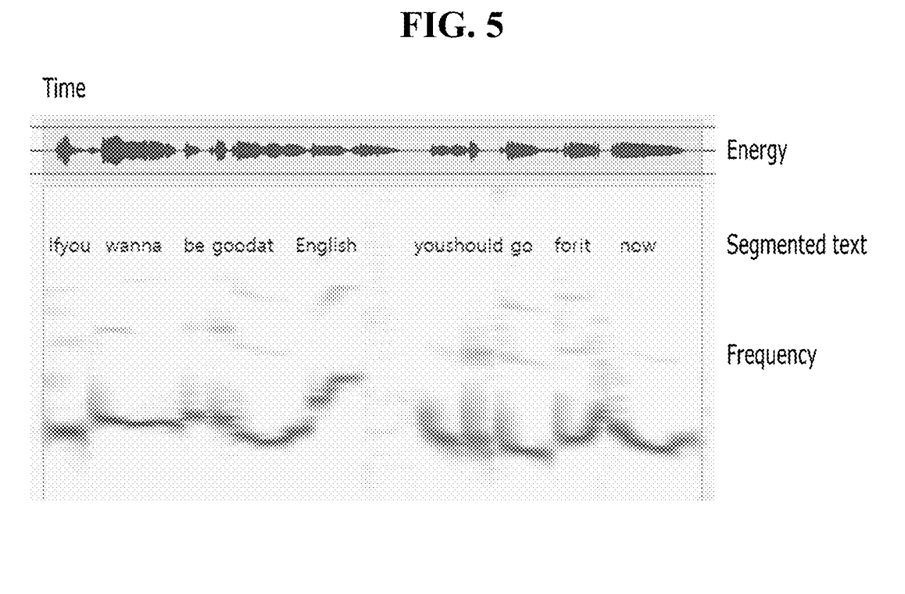
FIG. 5 shows an example of the speech information analyzed according to the present invention.

FIG. 5 shows an example of the speech information analyzed according to the present invention.

The text of the inputted reference speech information, "If you wanna be good at English, You should go for it now" is segmented with reference to the time and energy (amplitudes), as shown in FIG. 5. For example, one segment is applied to the pronunciation from which energy is continuously extracted for a given time. As shown in FIG. 5, it can be checked that the segments are divided differently from grammatical spacing. The segments arranged along a time axis are mapped to energy and frequency spectrums, and accordingly, information of pitch and sound pressure levels are analyzed and mapped to the respective segments of the speech information.

Figure 6:
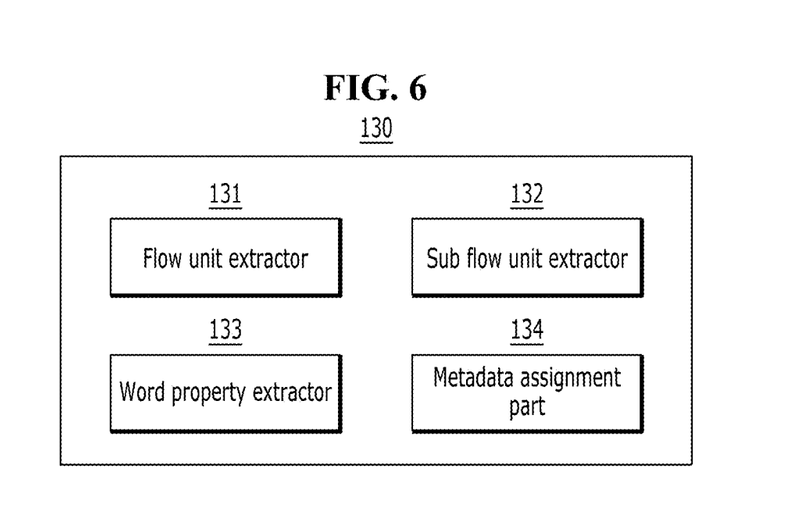
FIG. 6 is a block diagram showing a speech information classification unit of the speech visualization system according to the present invention.

FIG. 6 is a block diagram showing the speech information classification unit of the speech visualization system according to the present invention.

The speech information classification unit 130 includes a flow unit extractor 131, a sub flow unit extractor 132, a word property extractor 133, and a metadata assignment part 134.

The flow unit extractor 131 identifies and extracts the flow units from the analyzed speech information. According to the present invention, the flow units are divided, based on thought groups in the sentences. According to the present invention, the flow units represent the biggest units providing flows of thought, and when the thought is changed, the flow units mean that the pronunciation of the user should be also changed. At least one flow unit exists in a single sentence and is extracted using at least one or a combination of grammatical phrases and clauses, frequency/energy according to time, and the meaning analysis result according to the natural language processing.

The sub flow unit extractor 132 extracts at least one or more words or a combination of words that bind up smaller thought groups in the flow unit. The sub flow units represent physical units in which the words are not individually treated but combined with each other so that they are listened or spoken like a single word. According to the present invention, therefore, the sub flow units are extracted, based on the at least one or more segments or combinations divided in the speech information analysis unit 120.

The word property extractor 133 extracts the properties of the words constituting the sub flow units. The properties of words are divided into content words retaining meaning and function words used functionally. Normally, the content words are nouns, verbs, adjectives, and adverbs and have stress. The function words are pronouns, conjunctions, articles, prepositions and are softly pronounced without any stress. Further, the most important and strongly pronounced words on the speech information are additionally divided as focused content words.

If the flow units, the sub flow units, and the word properties are extracted, like this, the metadata assignment part 134 generates the classification extracted from the analyzed speech information as metadata and assigns the metadata to the speech information.

Figure 7:
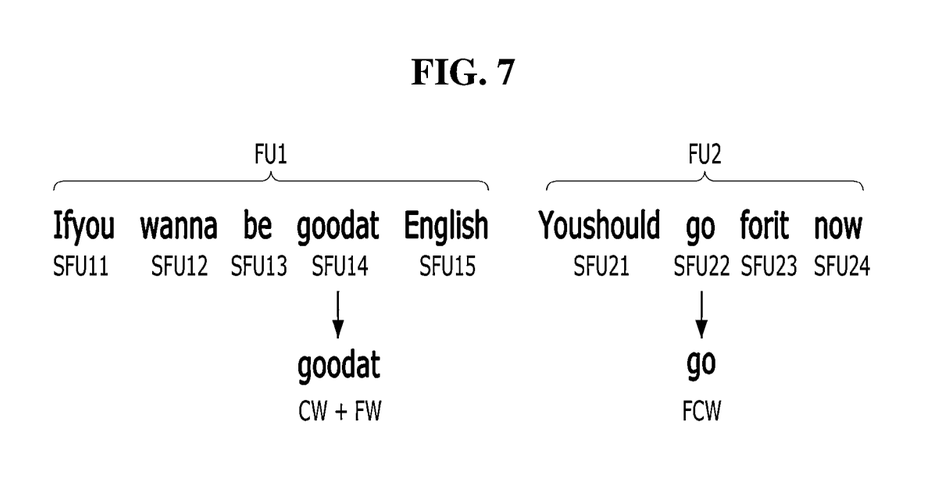
FIG. 7 shows an example of the speech information classified according to the present invention.

FIG. 7 shows an example of the speech information classified according to the present invention.

The text of the inputted reference speech information, "If you wanna be good at English, You should go for it now" is divided into two flow units according to the meaning, as shown in FIG. 7. In specific, the text of the inputted reference speech information is divided into a first flow unit FU1 "If you wanna be good at English" and a second flow unit FU2 "You should go for it now".

One flow unit is divided into at least one or more sub flow units SFU, and one sub flow unit includes at least one word.

For example, a sub flow unit SFU14 is made by combining words "good" and "at" to each other. The sub flow unit SFU14 is pronounced like a single word, but the word "good" having the properties of content word CW is differently pronounced in stress from the word "at" having the properties of function word FW.

If the word "go" as the sub flow unit SFU22 has the most emphasized input value, the word "go" is classified as the focused content word FCW.

Figure 8:
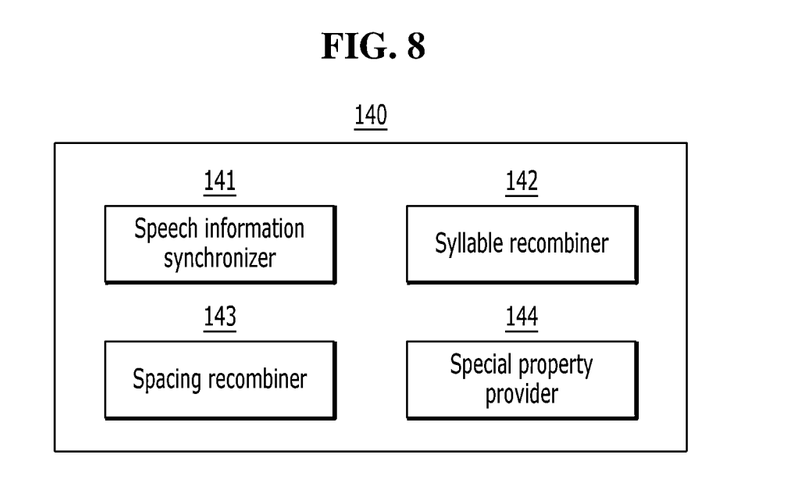
FIG. 8 is a block diagram showing a visualization property assignment unit of the speech visualization system according to the present invention.

FIG. 8 is a block diagram showing the visualization property assignment unit of the speech visualization system according to the present invention.

The visualization property assignment unit 140 includes a speech information synchronizer 141, a syllable recombiner 142, a spacing recombiner 143, and a special property provider 144.

The speech information synchronizer 141 synchronizes the flow units, the sub flow units, and the visualized graphic data of the words with the time stamp of the speech information.

The syllable recombiner 142 independently distinguishes the syllables pronounced really in the sentence to the form of speech visualization from the syllables defined by a dictionary and thus recombines the syllables. For example, when the two words included in a single sub flow unit are pronounced connectedly to each other, new syllables are recombined through the syllable recombiner 142.

The spacing recombiner 143 independently recombines the spacing to be provided for the speech visualization from the grammatical spacing. The spacing is represented with spaces having given lengths on the time axis.

The special property provider 144 provides special properties, such as stress, liaisons, silent letters, and schwa sounds, to be applied to the words.

As mentioned above, the syllables and spacing used for the speech visualization are independently reprocessed and recombined from those expressed in a dictionary or grammatically. According to the present invention, therefore, the visualization data recombined according to the meaning and nuance of the respective sentences are provided, and the user can figure out thoroughly the patterns through listening/speaking practice.

Figure 9:
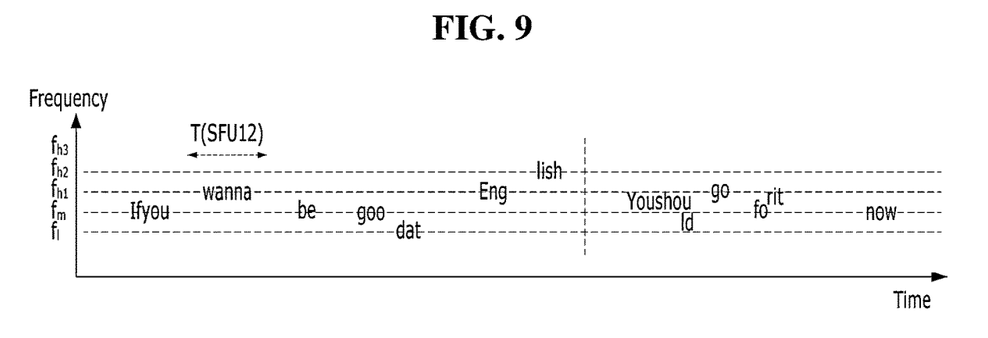
FIG. 9 shows an example of the visualization property assignment according to the present invention.

FIG. 9 shows an example of visualization property assignment according to the present invention.

For speech visualization, the sub flow units are arranged between the time axis and the frequency axis. The frequency is the reference of stress and pitch, and according to the present invention, the frequency is divided into fl, fm, fh1, fh2, and fh3. The fm is an intermediate frequency and a pronunciation having normal pitch, and accordingly, high and low frequency pronunciations are divided around the fm.

The fm is a start frequency of a sentence starting with a pronoun, the fl is used for a preposition, a conjunction, and an article, and the fh1/fh2 are used for emphasis/strong emphasis. The fh3 is not often used but it is a frequency generated on a big surprise, a fight, or the like.

The visualization properties about the heights of frequencies are assigned to the respective sub flow units, and through the assignment, the changes in the heights of frequencies in one sub flow unit can be checked. In specific, the sub flow units are divided through the continuity of pronunciation, so that time delays are visualized, and the respective sub flow units are visualized with the changes of frequencies according to the stress or content.

For example, the "wanna" as the sub flow unit SFU12 is visualized to be pronounced to the slightly high frequency fh1 during a time section T.

As shown in FIG. 9, it can be checked that the text to which the properties for visualization are applied is generated differently from the syllables and spacing expressed in a dictionary or defined by grammar. For example, "good" and "at" do not have any spacing, and new syllables "goo"

and "dat" are generated by recombining vowels and consonants, which are different from the "good" and "at". Different stress is applied to the new syllables. The visualization properties are not provided in the existing learning system, but they are the most realistic and effective data processing and expression methods in learning English as a second language.

Figure 10:
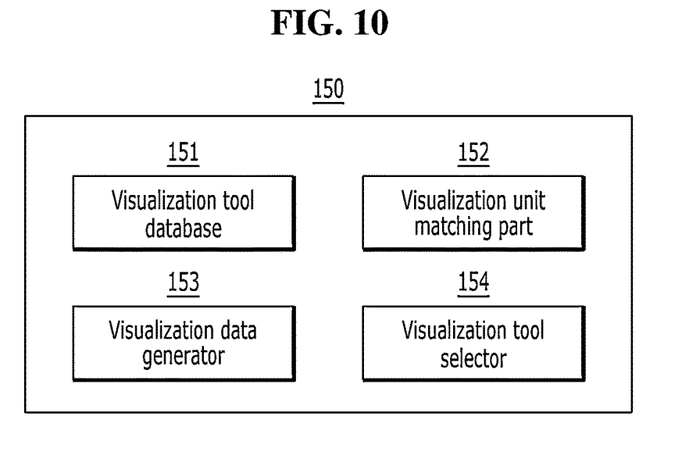
FIG. 10 is a block diagram showing a visualization processing unit of the speech visualization system according to the present invention.

FIG. 10 is a block diagram showing the visualization processing unit of the speech visualization system according to the present invention.

The visualization processing unit 150 includes a visualization tool database 151, a visualization unit matching part 152, a visualization data generator 153, and a visualization tool selector 154.

The visualization tool database 151 has a plurality of tools for visualizing the speech information to which the visualization properties are applied. In specific, according to the present invention, if the data to which the visualization properties are applied are used, various speech visualization may be provided, without being limited in a specific visualization design.

The visualization tool to be used provides the selection in various visualization method through the visualization tool selector 154 by the user, and the visualization tool is pre-checked through a user interface.

Visualization units representing the properties included in the selected visualization tool are matched using the visualization unit matching part 152.

If the visualization tool is selected and the visualization units are matched, the visualization data generator 153 generates speech visualization data and outputs the generated speech visualization data through the output unit 160.

Hereinafter, an explanation of the speech visualization data according to the present invention will be given in detail with reference to FIGS. 11 to 14.

Figure 11:
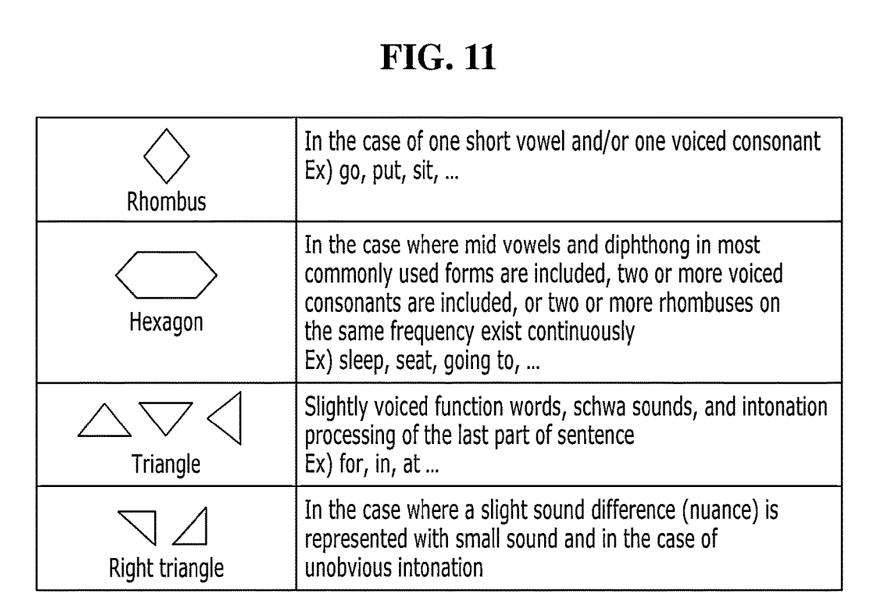
FIG. 11 shows examples of visualization units according to the present invention.

FIG. 11 shows examples of the visualization units according to the present invention.

As shown in FIG. 11, the visualization units are represented with a rhombus, a hexagon, a triangle, and a right triangle. The visualization units serve to allow the sub flow units, the content words, and the function words to be arranged on time and frequency axes to provide intuitive speech visualization effects. Further, the visualization units serve as an effective interface for an operator in generating and storing the speech visualization data. At least one surface of the polygon such as a rhombus, a hexagon, a triangle, and a right triangle representing the visualization units has an acute angle to allow its arrangement on the frequency axis to be accurately recognized and the heights between the visualization units to be intuitively recognized.

Figure 12:
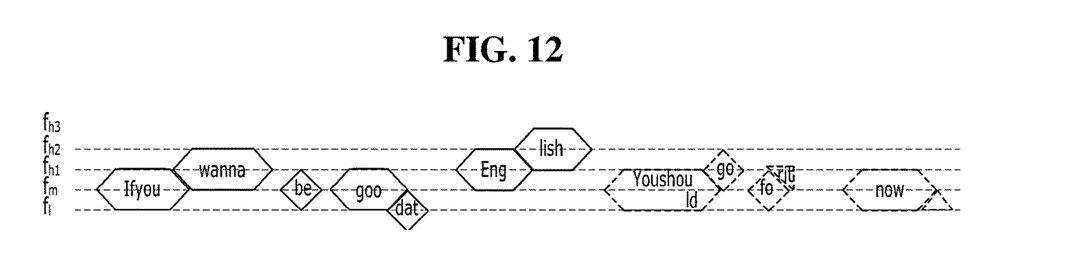
FIG. 12 shows an example of speech visualization data using the visualization units according to the present invention.

FIG. 12 shows an example of speech visualization data using the visualization units according to the present invention.

It is visually checked that the reference speech information of FIG. 12 includes two flow units and 13 sub flow units. Through the arrangements of the polygons as the visualization units, further, the user intuitively recognize the time interval between the words and the pitch of sounds and obviously knows that which words and syllables are pronounced with stress.

Figure 13:
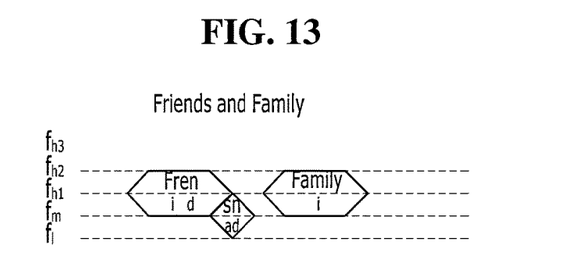
FIG. 13 shows an additional example of speech visualization data according to the present invention.

FIG. 13 shows an additional example of speech visualization data according to the present invention.

Within one visualization unit, some vowels or consonants of a word may be not arranged on the same line. In English, even if a word is written, the word may have vowels or consonants with no real sounds, and in this case, it is very effective to practice the word in a state where he or she recognizes only the vowels or consonants with sounds. As shown in FIG. 13, when 'Friends and Family' are pronounced, the vowels or consonants with no real sounds are disposed on the lower portions of the corresponding visualization units or on small size visualization units, so that the user easily recognizes the portions with real sounds, thereby performing English learning with pronunciation like the native speaker's pronunciation.

Figure 14:
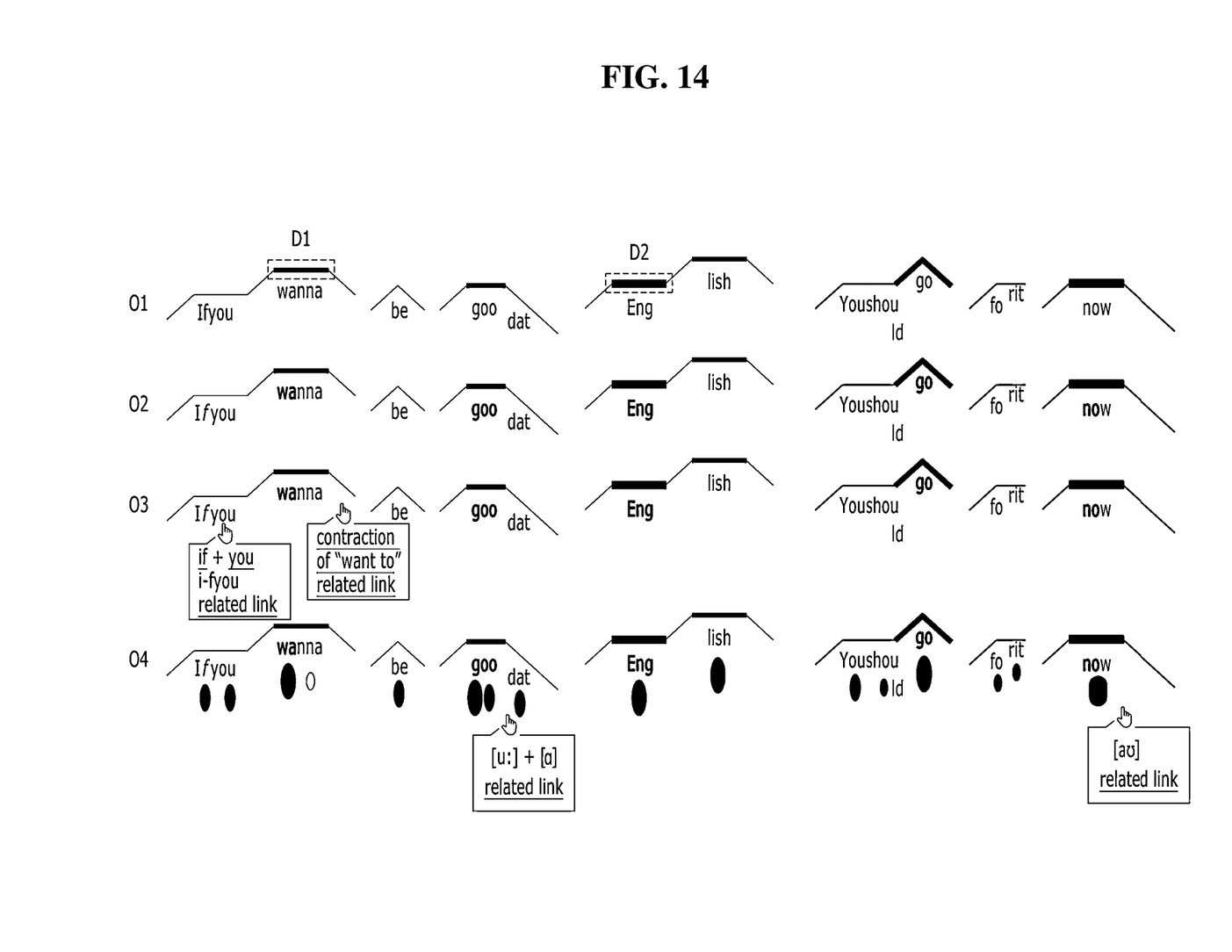
FIG. 14 shows various examples of the speech visualization data according to the present invention.

FIG. 14 shows various examples of the speech visualization data according to the present invention.

For the visualization data of FIG. 12, the selection of various visualization units, the representation of specific properties, and the selection of visualization tools are performed by the user, thereby generating speech visualization data O1 to O4 adequate for the user.

The speech visualization data O1 are the visualization data that are generated by extracting the top outer lines of the visualization units to provide better readability for the user. In this case, the tops D1 and D2 of the outer lines are different in thickness to represent the intensities of stress as well as the heights of frequencies. The top D2 is visualized thicker than the top D1, thereby being more stressed.

The speech visualization data O2 are the visualization data that are generated by representing the portions strongly pronounced in the sub flow units or words in boldface types, thereby adding the representation of stress to the heights of frequencies.

The speech visualization data O3 are the visualization data that are generated by applying special properties to special pronunciation or short forms to insert link information for providing explanations or individual pronunciations.

The speech visualization data O4 are the visualization data that are generated by adding ovals under the text to provide additional information for vowels and stress. For example, black ovals represent short vowels, and small gray ovals represent schwa sounds slightly pronounced. Two ovals having different sizes are used for long vowels, and ovals close to octagons are used for diphthongs. The specific properties of the vowels are provided through the insertion of link information for providing explanations or individual pronunciations.

According to the present invention, like this, it can be checked that various speech visualization is provided based on the visualization data uniquely generated according to the linguistic features of English.

Figure 15:
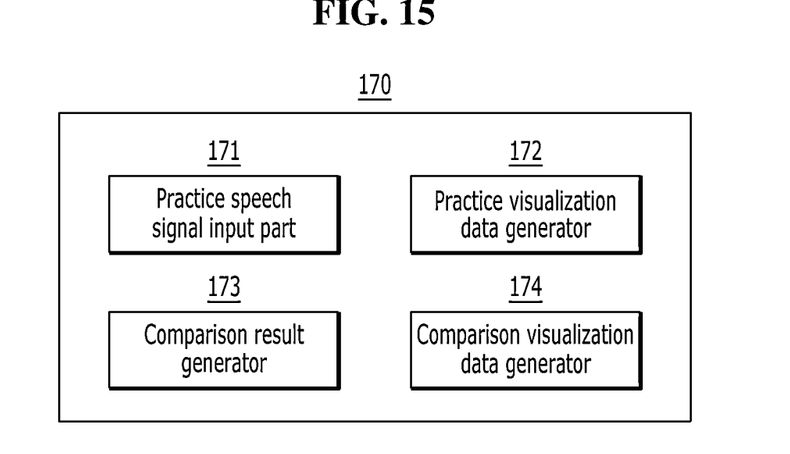
FIG. 15 is a block diagram showing a comparison processing unit of the speech visualization data according to the present invention.

FIG. 15 is a block diagram showing the comparison processing unit of the speech visualization data according to the present invention.

If the speech visualization data are provided for the user, he or she intuitively recognizes the pronunciation features and inputs his or her practice speech imitating the pronunciation features to a practice speech signal input part 171.

If the practice speech signals are inputted, a practice visualization data generator 172 generates practice visualization data based on the practice speech signals. The practice visualization data can be generated in the same method as the reference speech visualization data or in a simpler method through the reuse of information.

A comparison result generator 173 compares the reference speech information with the practice speech information to generate comparison values using the whole or some of the visualization data. According to the present invention, the visualization data are data reprocessed and recombined by considering important elements in real pronunciation, and accordingly, the similarity based on the visualization data is available as a reference for determining whether the user has the pronunciation similar to the real pronunciation of the reference speech information.

A comparison visualization data generator 174 generates comparison visualization data for graphically displaying the numerical values of the similarity or the comparison results of the visualization data and provides the comparison visualization data through the output unit 160.

Under the above-mentioned configurations, the user learns English through the speech visualization data having the most similar information to the real pronunciation and estimates and checks his or her practice results on the same speech visualization interface.

Figure 16:
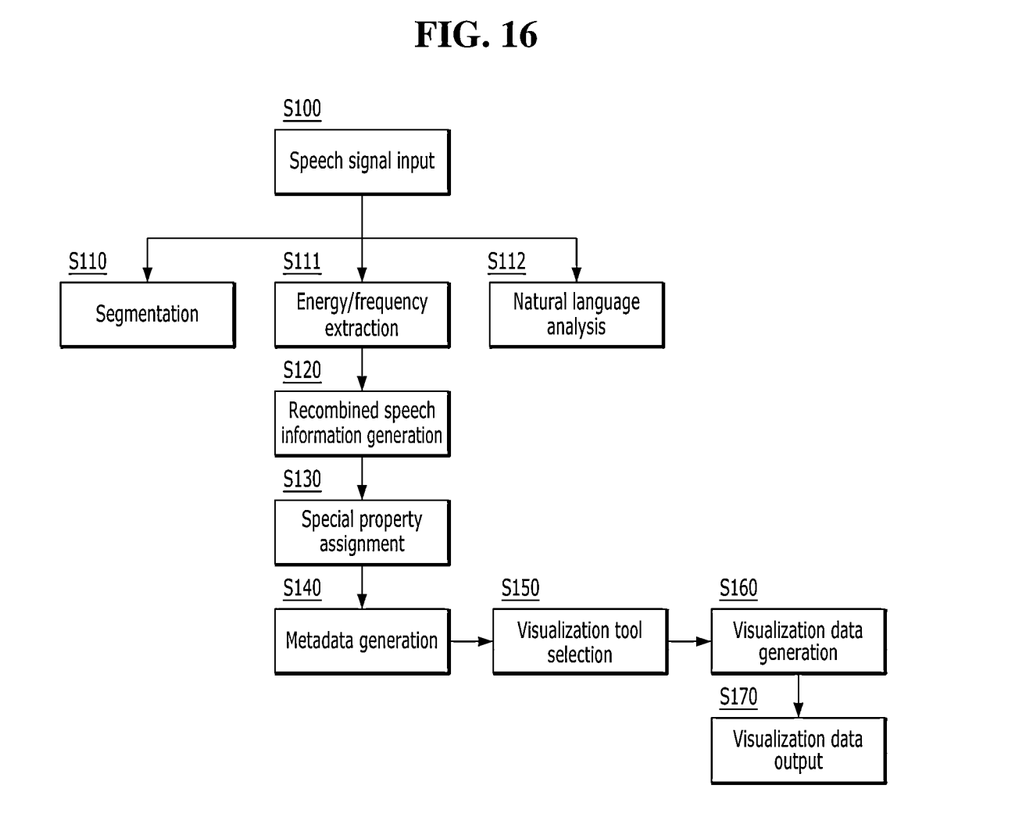
FIG. 16 is a flowchart showing a speech visualization method according to the present invention.

FIG. 16 is a flowchart showing a speech visualization method according to the present invention.

In a speech visualization method according to the present invention, with respect to the same components, even though they may be explained in the speech visualization system, such components use same reference numerals as much as possible, and accordingly, the repeated description on the components will be omitted.

In step S100, physical speech signals corresponding to English sentence pronunciation are received. The speech signals are generated through the direction vocalization of the reference speech of the user, and further, they may be generated through automated TTS type reference speech. The speech signals are represented with elements of frequencies, amplitudes (energy), and time.

In step S110, the received speech signals are divided into at least one or more segments. The segments do not necessarily correspond to grammatical spacing and are generated by time information of the speech signals having real energy.

In step S111, energy and frequencies are extracted from the received speech signals. The extracted values are sampled or normalized only to the ranges for the speech visualization.

If natural language processing is needed, further, it is performed in step S112. The natural language processing requires the ability of dividing flow units, sub flow units, content words, function words, and special properties on the speech information received.

In step S120, recombined speech information is generated using the pre-processing results in the steps S110 to S112. On the recombined speech information, the syllables pronounced really in the sentence are independently distinguished to the form of speech visualization from the syllables defined by a dictionary and thus recombined. For example, when the two words included in a single sub flow unit are pronounced connectedly to each other within the sub flow unit, new syllables are recombined through the syllable recombiner.

The spacing to be provided for the speech visualization is recombined independently from the grammatical spacing. The spacing is represented with spaces having given lengths on the time axis.

In step S130, special properties for the visualization properties are assigned to the speech information. The special properties of the speech information include at least one or more of stress, liaisons, silent letters, schwa sounds, and special diphthongs.

In step S140, the metadata corresponding to the flow units, the sub flow units, the content words, and the function words of the recombined speech information with the special properties assigned thereto are applied to the speech information. Further, the metadata having the focused content word properties are applied to the most important and strongly pronounced words on the speech information. The metadata applied to the recombined speech information are visualized using visualization tools.

In step S150, the visualization tool used for speech visualization is selected. The visualization tool to be used provides the selection in various visualization methods from the visualization tool database by the user, and accordingly, the visualization tool is pre-checked through the user interface.

If the visualization tool is selected, speech visualization data are generated using the recombined speech information to which the visualization tool and metadata are applied in step S160.

The generated speech visualization data are outputted through the output unit 160 in step S170. The speech visualization data are outputted through graphic or animation predetermined in the visualization tool, while being synchronized with the speech.

With the speech visualization data, the user can perform listening/speaking practice through which the linguistic features of English and the real pronunciation are intuitively grasped.

Figure 17:
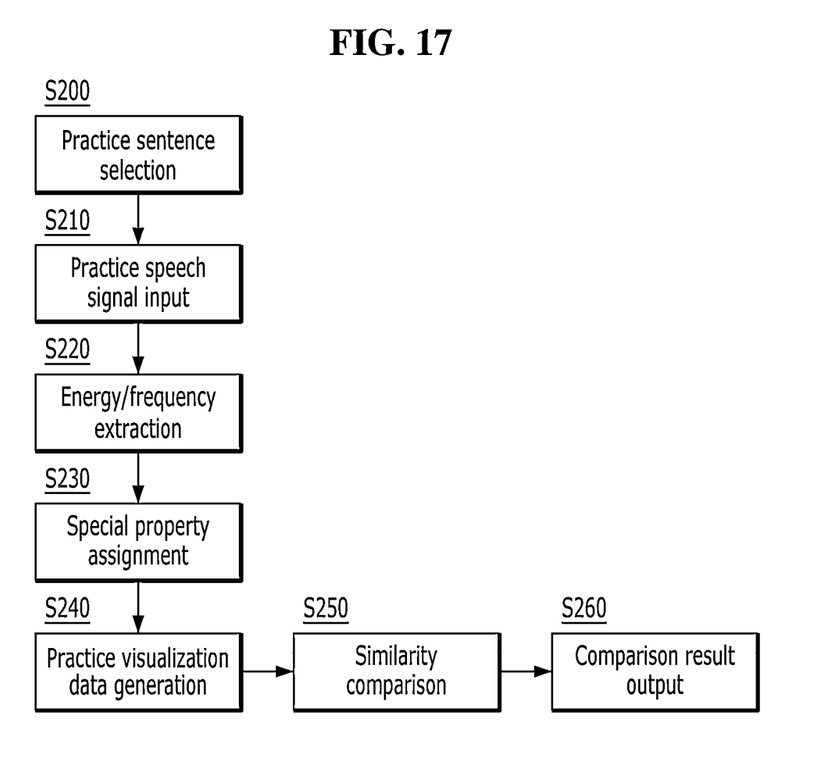
FIG. 17 is a flowchart showing a method for providing comparison results of the speech visualization data according to the present invention.

FIG. 17 is a flowchart showing a method for providing comparison results of speech visualization data according to the present invention.

In step S200, selection of practice sentences is provided for the user. The practice sentences are the text corresponding to the reference speech visualization data generated according to the speech visualization method as shown in FIG. 16.

If the reference speech visualization data are provided, the user inputs practice speech signals using an audio input device in step S210.

From the practice speech signals of the user, energy and frequencies are extracted in step S220, and special properties are assigned to the practice speech signals of the user in step S230, thereby performing the pre-processing for generating visualization data.

Practice visualization data are generated using the pre-processed results in step S240. The practice visualization data utilize some of the information of the reference speech visualization data as the subject of practice, and accordingly, they are generated with a smaller number of operations than the reference speech visualization data.

If the practice visualization data are generated, the similarity of the reference speech to the practice speech is obtained in step S250. In the comparison of the similarity, the whole or some of the respective visualization data may be used to produce comparison values. According to the present invention, the visualization data are data reprocessed and recombined by considering important elements in real pronunciation, and accordingly, the similarity based on the visualization data is available as a reference for determining whether the user has the pronunciation similar to the real pronunciation of the reference speech information.

In step S260, comparison visualization data for graphically displaying the numerical values of the similarity or the comparison results of the visualization data are generated and outputted to the output unit.

Through the above-mentioned steps, the user learns English through the speech visualization data having the most similar information to the real pronunciation and estimates and checks his or her practice results on the same speech visualization interface.

The method according to the present invention as described above may be implemented in the form of a program instruction that can be performed through various computers and recorded in a computer readable recording medium. The computer readable medium may include a program command, a data file, a data structure, and the like independently or in combination. The program instruction recorded in the recording medium is specially designed and constructed for the present disclosure, but it may be well known to and may be used by those skilled in the art of computer software. The computer readable recording medium may include a magnetic medium such as a hard disc, a floppy disc, and a magnetic tape, an optical recording medium such as a Compact Disc Read Only Memory (CD-ROM) and a Digital Versatile Disc (DVD), a magneto-optical medium such as a floptical disk, and a hardware device specifically configured to store and execute program instructions, such as a Read Only Memory (ROM), a Random Access Memory (RAM), and a flash memory. Further, the program command may include a machine language code generated by a compiler and a high-level language code executable by a computer through an interpreter and the like. The hardware device may be configured to operate as one or more software modules so as to perform operations of the present disclosure, and vice versa.

The method according to the present invention as described above may be implemented in the form of a program that can be performed in an electronic device. The electronic device may include a portable communication device such as a smartphone or smart pad, a computer, a portable multimedia device, a portable medical device, a camera, a wearable device, and a home appliance.

The method according to the present invention as described above may be provided to be included in a computer program product. The computer program product as a product is traded between a seller and a purchaser. The computer program product may be distributed to the form of a recordable medium through a device or online through an application store. In the case of the online distribution, at least some of the computer program product may be temporarily stored or temporarily generated in and from a storage medium such as a server of a manufacturer, a server of the application store, or a memory of a relay server.

The components, for example, modules or programs according to the present invention may have one or a plurality of sub components, and some of the sub components may be omitted. Otherwise, other sub components may be added. Some of components (modules or programs) may be integrated as one individual, and the functions performed by the respective components before the integration may be implemented in the same or similar manner. The operations performed by the modules, programs, or other components according to the present invention may be implemented sequentially, in parallel, repeatedly, or heuristically, and otherwise, some of the operations may be implemented in different order, omitted, or added with other operations.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, the parts expressed in a singular form may be dispersedly provided, and in the same manner as above, the parts dispersed may be combined with each other.

Thus, although the invention has been described with respect to specific embodiments, it will be appreciated that the invention is intended to cover all modifications and equivalents within the scope of the following claims.

INDUSTRIAL APPLICABILITY OF THE INVENTION

According to the present invention, the speech visualization system and method for English learning can provide the visualization data of the English speech on which thought groups are reflected according to the context of English sentences.

According to the present invention, further, the speech visualization system and method for English learning can provide the speech visualization data on which the linguistic features of English not dependent on the syllables and spacing of texts are reflected.

According to the present invention, moreover, the speech visualization system and method for English learning can provide the speech visualization data with which real English pronunciation and stress are intuitively grasped.

According to the present invention, furthermore, the speech visualization system and method for English learning can visualizedly compare the pronunciation of the user with the speech visualization data.

The invention claimed is:
1. A speech visualization system comprising:
a speech signal input unit for receiving speech signals of sentences with English pronunciation;
a speech information analysis unit for analyzing speech information with frequencies, energy, and time of the speech signals and the text corresponding to the speech signals to divide the speech information into at least one or more segments;
a speech information classification unit for classifying the segments of the speech information into flow units and each flow unit into at least one or more sub flow units each having at least one or more words;
a visualization property assignment unit for assigning visualization properties for speech visualization to the analyzed and classified speech information; and
a visualization processing unit for performing visualization processing based on the assigned visualization properties to generate speech visualization data,
wherein the visualization processing unit comprises: a visualization tool database for storing visualization tools; a visualization tool selector for providing the selection of the visualization tools stored in the visualization tool database; and a visualization unit matching part for matching visualization units representing the visualization properties included in the visualization tool with the assigned visualization properties, and the visualization units have the shapes of polygons whose at least one surface has an acute angle to allow arrangements on a frequency axis to be accurately recognized so that the heights between the visualization units are intuitively recognized.

2. The speech visualization system according to claim 1, wherein the segments are divided with respect to time during which continuous pronunciation is provided.

3. The speech visualization system according to claim 1, wherein the speech information analysis unit comprises a natural language processor for performing natural language processing, and the properties of the at least one or more words included in the sub flow units are classified into content words having meaning and function words used functionally, the content words and the function words of the sub flow units being visualized with frequency height information different from each other.

4. The speech visualization system according to claim 1, wherein the visualization property assignment unit comprises a syllable recombiner for recombining the at least one or more words to the syllables pronounced continuously in the corresponding sub flow unit.

5. The speech visualization system according to claim 1, wherein the visualization property assignment unit comprises a special property provider for providing at least one or more of stress, liaisons, silent letters, schwa sounds, and diphthongs.

6. The speech visualization system according to claim 1, wherein among the words in the speech visualization data, vowels or consonants with no real sounds are disposed on the lower portions of the corresponding visualization units or on small size visualization units, so that the portions with real sounds are emphasized.

7. The speech visualization system according to claim 1, wherein tops of the outer lines of the speech visualization data are different in thickness so that the intensity of stress is represented according to the thicknesses of the tops.

8. The speech visualization system according to claim 1, further comprising:
   an output unit for synchronizing the speech visualization data with the speech signals and outputting the synchronized speech visualization data; and
   a comparison processing unit for providing comparison result values between the outputted speech visualization data and practice speech signals received from a user.

9. The speech visualization system according to claim 8, wherein the comparison processing unit generates practice visualization data based on the practice speech signals and provides the comparison results between the practice visualization data and the outputted speech visualization data.

10. A speech visualization method comprising the steps of:
   receiving speech signals represented with frequencies, energy, and time;
   performing speech information pre-processing in which the speech signals are divided into at least one or more segments, based on time information with the energy included in the speech signals, and natural language processing is performed;
   classifying the segments of the speech information into flow units and each flow unit into at least one or more sub flow units each having at least one or more words to thus generate recombined speech information;
   applying metadata to the flow units, the sub flow units, and the at least one or more words to assign visualization properties to the recombined speech information;
   providing the selection of visualization tools for visualization processing using the visualization properties;
   if the visualization tool is selected, generating speech visualization data using the recombined speech information to which the metadata are applied; and
   outputting the generated speech visualization data,
   wherein the visualization properties have the arrangements of the sub flow units on a time axis and the frequency height information on each sub flow unit, and the speech visualization data have visualization units with the shapes of polygons whose at least one surface has an acute angle to allow arrangements on a frequency axis to be accurately recognized so that the heights between the visualization units are intuitively recognized.

11. The speech visualization method according to claim 10, further comprising the step of assigning special properties in which at least one or more of stress, liaisons, silent letters, schwa sounds, and diphthongs are assigned, after the step of generating the recombined speech information.

12. The speech visualization method according to claim 10, wherein the properties of the at least one or more words included in the sub flow units are classified into content words having meaning and function words used functionally, the content words and the function words of the sub flow units being visualized with frequency height information different from each other.

13. The speech visualization method according to claim 10, wherein among the words in the speech visualization data, the vowels or consonants with no real sounds are disposed on the lower portions of the corresponding visualization units or on small size visualization units, so that the portions with real sounds are emphasized.

14. The speech visualization method according to claim 11, wherein tops of the outer lines of the speech visualization data are different in thickness so that the intensity of stress is represented according to the thicknesses of the tops.

15. The speech visualization method according to claim 10, further comprising the steps of:
   receiving practice speech signals from a user;
   generating practice speech visualization data of the practice speech signals; and
   outputting comparison result values of the similarity between the outputted speech visualization data and the practice speech visualization data.

* * * * *